United States Patent
Chen

(10) Patent No.: US 10,804,645 B2
(45) Date of Patent: Oct. 13, 2020

(54) WATERPROOF DEVICE FOR UNDERWATER WIRE CONNECTION

(71) Applicant: SHENZHEN TONGYIKA TECHNOLOGY CO., LTD., Shenzhen OT (CN)

(72) Inventor: Yong Chen, Mianzhu (CN)

(73) Assignee: SHENZHEN TONGYIKA TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/231,870

(22) Filed: Dec. 24, 2018

(65) Prior Publication Data

US 2019/0131739 A1 May 2, 2019

Related U.S. Application Data

(63) Continuation of application No. PCT/CN2017/089895, filed on Jun. 24, 2017.

(30) Foreign Application Priority Data

Jun. 26, 2016 (CN) .......................... 2016 1 0469688

(51) Int. Cl.
  *H01R 13/523* (2006.01)
  *H02G 15/08* (2006.01)
  *H02G 9/02* (2006.01)
  *H01R 13/516* (2006.01)

(52) U.S. Cl.
  CPC ............. *H01R 13/523* (2013.01); *H02G 9/02* (2013.01); *H02G 15/08* (2013.01); *H01R 13/516* (2013.01)

(58) Field of Classification Search
  CPC ....... H01R 13/516; H01R 13/523; H02G 9/02
  See application file for complete search history.

(56) References Cited

U.S. PATENT DOCUMENTS 3,602,873 A * 8/1971 Childers .............. H01R 13/523
  439/201
4,375,311 A * 3/1983 Feldman .................. H01R 4/32
  439/487

(Continued)

FOREIGN PATENT DOCUMENTS

CN        2438231 Y     7/2001
CN      201956650 U     8/2011

(Continued)

OTHER PUBLICATIONS

Internation Search Report of PCT/CN2017/089895, dated Sep. 6, 2017.

*Primary Examiner* — Tho D Ta
(74) *Attorney, Agent, or Firm* — Andrew C. Cheng

(57) ABSTRACT

A waterproofing device for underwater wire connection comprises: a base, a clamping portion a tank port, a tank neck groove, an inverted tank, a connecting portion for two wires in inverted tank and close to the top of the tank. The two wires are in the inverted tank and close to the top of the tank, and are two wires connected well. The base is fixed on the ground and is configured to fix wires and the inverted tank. A bottom of the clamping portion is fixed on the base, and the clamping portion is configured to clamp the groove; the exposed part of the wire in the tank does not contact with water when the water overflows the tank with the mouth facing down, and the two connected wires can conduct electricity normally; the waterproofing can also be monitored and added into the tank.

15 Claims, 12 Drawing Sheets

(56) References Cited

U.S. PATENT DOCUMENTS

| | | | | |
|---|---|---|---|---|
| 4,424,407 A | * | 1/1984 | Barbic | H01R 13/447 174/67 |
| 5,729,442 A | * | 3/1998 | Frantz | H01R 9/24 361/728 |
| 6,108,202 A | | 8/2000 | Sumida | |
| 6,135,826 A | * | 10/2000 | Kovach | H01H 36/0033 174/138 F |
| 6,213,808 B1 | * | 4/2001 | Whatmore | H01R 13/516 439/417 |
| 7,597,567 B2 | * | 10/2009 | Tanaka | H01R 12/725 439/135 |
| 2016/0050784 A1 | | 2/2016 | Ikeda et al. | |

FOREIGN PATENT DOCUMENTS

| | | |
|---|---|---|
| CN | 102938990 A | 2/2013 |
| CN | 103935621 A | 7/2014 |
| CN | 105071064 A | 11/2015 |
| CN | 105896454 A | 8/2016 |
| CN | 105932478 A | 9/2016 |
| CN | 105977696 A | 9/2016 |
| CN | 106248320 A | 12/2016 |
| CN | 106289441 A | 1/2017 |
| CN | 106300222 A | 1/2017 |
| CN | 106300227 A | 1/2017 |
| CN | 106321401 A | 1/2017 |
| CN | 106329463 A | 1/2017 |
| CN | 106356800 A | 1/2017 |
| CN | 106410736 A | 2/2017 |
| CN | 106451301 A | 2/2017 |
| CN | 106451310 A | 2/2017 |
| CN | 106451317 A | 2/2017 |
| CN | 106451321 A | 2/2017 |
| CN | 106451322 A | 2/2017 |
| CN | 106571614 A | 4/2017 |
| CN | 106655070 A | 5/2017 |
| JP | 2008035679 A | 2/2008 |

* cited by examiner

WATERPROOF DEVICE FOR UNDERWATER WIRE CONNECTION

CROSS-REFERENCE TO RELATED APPLICATIONS

This application is a continuation of International Patent Application No. PCT/CN2017/089895 with a filing date of Jun. 24, 2017, designating the United States, now pending, and further claims priority to Chinese Patent Application No. 201610469688.7 with a filing date of Jun. 26, 2016. The content of the aforementioned applications, including any intervening amendments thereto, are incorporated herein by reference.

TECHNICAL FIELD

The disclosure relates to the field of electric wires, in particular to an underwater wire connection waterproof device.

BACKGROUND OF THE PRESENT INVENTION

Electric wires in cities are usually laid through underground pipelines, but nowadays El Nio phenomena often occur. Water flooding is a common phenomenon. Once there is water flooding, underground wires cannot be used, and large-scale power outages occur. This problem can be solved by the present disclosure.

SUMMARY OF PRESENT INVENTION

The problem to be solved by the present disclosure is: to solve the problem of waterproofing of electric wires in rain and water, the price should be low and the use should be convenient The disclosure provides an underwater wire connection waterproof device, a base, a clamping portion, a tank port, a tank neck groove and an inverted tank, a connecting portion for two electric wires is located in the inverted tank and is close to an upper part of the inverted tank; the two electric wires are two electric power transmission lines whose insulating layers are intact, and electric leads at one end are penetrated from the tank port to be located in the inverted tank and are close to the upper part of the inverted tank after being connected; the base is fixed on the ground and fixes the electric wires and the inverted tank; a bottom of the clamping portion is fixed on the base, the clamping portion latches the tank neck groove; the tank port contacts with the base; the tank neck groove is located at a neck on the tank port of the inverted tank and matched with the clamping portion; the inverted tank is a tank whose port is downwardly erected, and other parts are sealed except that the tank port is communicated with an external.

This device is the basic device, hereinafter referred to as the underwater wire connection device.

Preferably, according to an underwater wire connection waterproofing device, the connection manner of the connecting portion is a standard joint manner.

Preferably, according to an underwater wire connection waterproofing device, the connection manner of the connecting portion is a wiring board manner, the two electric wires are respectively fixed on the same conductive metal with screws so that the two electric wires are connected, and the structure of a wiring board is fixed on an insulating bracket.

Preferably, according to an underwater wire connection waterproofing device, the connection manner of the connecting portion is plug-in connection meeting an electrical standard.

Beneficial effect: When the water overflows the tank facing down, the exposed part of the electric wire in the tank will not contact with the water, and the two connected wires can conduct electricity normally. The disclosure has exquisite conception, simple structure, reliable performance, easy production and installation, and is suitable for any electric wire joint that needs to transmit electric power in rain or underwater.

An underwater wire connection waterproofing device includes an underwater wire connection device, which is also characterized by adding a bracket, a water-touching probe, a signal processing device and an alarm device. The underwater wire connection device consists of a base, a clamping portion, a tank neck groove, an inverted tank, and a tank port, a connecting portion for two wires in inverted tank and close to the top. The bottom of the bracket is fixed on the base, and the upper part is equipped with a water-touching probe and a signal processing device; the water-touching probe is installed on the bracket, and is a device which is conducted after touching water, and is connected with the alarm device; the signal processing device is installed on the bracket, and the signal input is connected with the water-touching probe, and the alarm signal after processing is connected with the alarm device through a wire. The alarm device receives the alarm signal through the wire and sends out sound and light signals, so that the live administrator knows that the underwater wire connection device has no alarm device in the water, which is installed in the supervisory place of the manager.

Beneficial effect: Know which underwater wire connection device has reached the safety point in time and accurately, so as to facilitate timely mastery and maintenance.

An underwater wire connection waterproofing device includes an underwater wire connection device and a warning water level, which is also characterized by a method of increasing air volume in the inverted tank; the underwater wire connection device consists of a base, a clamping portion, a tank neck groove, an inverted tank and an tank roof on which a connecting portion for two wires are located in and close to the inverted tank; and the warning water level is used when the water in the tank is filled. When it reaches this position, the water will immediately overflow to the position of a safe water level where the short circuit is caused by the connecting portion of the electric wire; the increase in the amount of air in the inverted tank is to pour air into the inverted tank.

Beneficial effect: With the rising water level outside the tank, the air in the tank will be compressed by pressure. When the water level rises to a certain extent, the air in the tank will be compressed and further reduced to allow the water to flood the connection, resulting in short circuit. At this time, it is necessary to increase the air in the inverted tank, increase the air volume in the tank, and the underwater electrical wiring connection waterproof device can work normally.

Preferably, a method for increasing the amount of air in an inverted tank with underwater wire connection waterproof device is characterized by adding a bracket, a water-touching probe, a signal processing device, an air pump, and a conduit to form an automatic air increase device. The bracket, which stands on the base, and the height does not exceed the top of the tank, bears the water-touching probe, the signal processing device and the air pump. The conduit, one end of which is connected to the inlet of the air pump, the other end is erected through the bottom of the tank to the outside of the tank and is at least higher than the bottom of the tank. The air pump, a pump device, is directed by a signal processing device and is mounted on the upper part of the bracket, and the air inlet is connected with a conduit. The water-touching probe shall be mounted on a bracket and the installation position shall be the warning water level position. The output signal of the detection device is connected to the signal processing device. The signal processing starter is mounted on a bracket and receives a water diffuser signal from the water-touching probe, and the air pump is started to work for a fixed time.

Useful effect: when the water is flooded through the tank and the water in the tank spreads to the alert position, the disclosure can automatically add air and increase the air in the tank, so that the water level in the tank is always below the alert position. It guarantees the safety of underwater wire connection waterproof device.

Preferably, a method for increasing the amount of air in an inverted tank with an underwater wire connection waterproof device, which is characterized by further comprising brackets, chemical medicines, and a chemical medicine basket in the tank. And the bracket is mounted on a base and the chemical medicine basket is arranged at a warning water level. The chemical medicine is converted into a gas in the presence of water and the gas is not conductive and is placed in a chemical medicine basket. The chemical medicine basket is arranged on the warning water level and is loaded with chemical medicines.

Useful effect: when the water is flooded through the tank and the water in the tank spreads to the position of the chemical medicine basket, the disclosure can automatically increase the air in the tank, so that the water level in the tank is always below the alert position. It guarantees the safety of underwater wire connection waterproof device.

Preferably, the method of increasing the amount of air in the inverted tank with underwater wire connection waterproof device is characterized by increasing the bracket, an air pressure tank, a gas releasing device, and a water-touching probe. The bracket, which stands on a base, bears the air pressure tank and a water-touching probe. The air pressure tank is mounted on the bracket, directed by a gas releasing device, and a fixed release device is applied to the air pressure tank, and a non-conductive compressed gas is installed in the air pressure tank. The gas releasing device is fixed on the air pressure tank, and is connected with the water outlet pipe of the tank, and receives the signal emitted by the water-touching probe and makes corresponding actions. The water-touching probe is fixed on the bracket. When there is water outside the tank and it diffuses through the mouth of the tank, there is water in the tank. When the water diffuses to the warning water level, the water-touching probe sends a signal and the signal is sent to the gas releasing device.

Useful effect: when the water is flooded through the tank and the water in the tank spreads to the alert position, the disclosure can automatically add air and increase the air in the tank, so that the water level in the tank is always below the alert position. It guarantees the safety of underwater wire connection waterproof device.

Preferably, the method of increasing the amount of air in the inverted tank with underwater wire connection waterproof device is characterized by further comprising a bracket, a water electrolysis device, a water-touching probe, and a signal processing device. The bracket, which is mounted on a base, bears the water electrolysis device, the water-touching probe and the signal processing device. The water electrolysis device is arranged on the bracket in a tank and has 2 electrodes. The electrode, a part of the water electrolysis device, is located outside the mouth of the tank, and the hydrogen electrode is below the mouth of the tank, and the other oxygen electrode is outside the range below the mouth of the tank. The water-touching probe is installed on a bracket. When there is water outside the tank, it spreads to the water level in the tank. When the water reaches the warning water level, the water-touching probe will send a signal to the signal processing device. The signal processing device is mounted on the bracket and receives a signal from the water level detecting device that the diffuse water has reached the warning water level, and starts the water electrolysis device to work for a fixed time.

Useful effect: when the water is flooded through the tank and the water in the tank spreads to the alert position, the disclosure can automatically add air and increase the air in the tank, so that the water level in the tank is always below the alert position. It guarantees the safety of underwater wire connection waterproof device.

Preferably, the method of increasing the amount of air in the inverted tank with underwater wire connection waterproof device is characterized by a portable inflatable device consisting of a portable motor, a portable air pump, a conduit, a crutch-type air delivery pipe, and a switch device. The portable motor is connected with the portable air pump to provide power for the portable air pump. The portable air pump is connected with the portable motor, an outlet is connected with a conduit, and air is pressurized and stored. The conduit, one end is arranged on the portable air pump and one end is connected with the switch device on the crutch-type air delivery pipe. The crutch-type air delivery pipe is tubular, one end is connected with the conduit through the switch device, and one end is a curved shape of a crutch. The switch device, which releases compressed gas from the switch, is arranged on the crutch-type air delivery pipe and is connected with a conduit. The portable inflatable device consists of the portable motor, the portable air pump, the conduit, the crutch-type air delivery pipe, and the switch device.

Useful effect: can manually inflate into inverted tank.

The disclosure relates to an underwater wire connection waterproofing device, which includes an underwater wire connection waterproofing device, which is also characterized by the placement of several blocks with lighter gravity than water on the base. The underwater wire connection device consists of a base, a clamping portion, a tank port, a tank neck groove, an inverted tank, and a connecting portion for two wires in an inverted tank and close to the top of the tank. A few blocks with lighter specific gravity than water are placed on the base, which are lighter than water in terms of specific gravity, but the gravity is preferred to be 0.7-0.9. The number of blocks meets that: when floating on the surface of the tank, it basically covers the surface of the tank.

Useful effects: in the underwater wire connection waterproof device vibration state, reduce or avoid the waterproof device because of water spatter, threatening the wire connection to each other and short-circuit, waterproof safety.

The disclosure relates to an underwater wire connection waterproof device, including an underwater wire connection waterproof device, which is also characterized by further comprising a bracket and a circuit breaker. The underwater wire connection device consists of a base, a clamping portion, a tank port, a tank neck groove, an inverted tank, and a connecting portion for two wires in an inverted tank and close to the top of the tank. The bracket, the lower end of which is fixed on the base and the circuit breaker is fixed above. The circuit breaker, which is fixed on a bracket, is an electric leakage prevention device of an existing technology, and has an input and output connected with a wire, and the normal state is in conduction.

Useful effect: when the underwater wire connection behind the waterproof device appears to short-circuit, the underwater wire connection waterproof device immediately disconnects, does not supply it, the underwater wire connection waterproof device, that is, the previous circuit is still powered. Avoidance of electrical outage.

An underwater wire connection waterproof device includes an underwater wire connection waterproof device, which is also characterized by filling the tank with oil lighter than water. The underwater wire connection device consists of a base, a clamping portion, a tank port, a tank neck groove, an inverted tank, and a connecting portion for two wires in an inverted tank and close to the top of the tank. The tank is filled with oil lighter than water, and the oil is poured into the tank. The perfusion position is at least to the protected position, and the perfusion oil has the characteristics of lighter and insulation than water.

Useful effect: no longer worry about the underwater wire connection in the deep water waterproof device will cause short circuit due to pressure problems.

An underwater wire connection waterproof device includes an underwater wire connection device, which is also characterized by further comprising external safety protection devices. The underwater wire connection device consists of a base, a clamping portion, a tank port, a tank neck groove, an inverted tank, and connecting portion for two wires in an inverted tank and close to the top of the tank. The external safety protection device is mounted on a protective protection layer outside an underwater wire connection waterproof device, the shape is a gentle bulge, and the raised interior is an underwater wire connection waterproof device. The protective layer may be a mesh or a sheet, and the protective layer material has a strong water resistance feature.

Useful effect: avoid the underwater wire connection in the water waterproof device is damaged by external factors and dragged by other things.

An underwater wire connection waterproof device, including an underwater wire connection device, is also characterized by further comprising a bracket, a gas probe, a gas probe, a signal processing device, and an alarm device. The underwater wire connection device consists of a base, a clamping portion, a tank port, a tank neck groove, an inverted tank, and connecting portion for two wires in an inverted tank and close to the top of the tank. The bracket, which is mounted on a base, bears a gas probe and a signal processing device. The detection gas is filled with an inverted tank in a working state, which has the characteristics of lighter specific gravity than air, easier detection and higher safety. The gas probe, which is mounted on a bracket, is a device that sends an alarm signal without detecting the gas being detected, and is connected with an alarm device. The signal processing device is mounted on a bracket and the signal input is connected with a gas probe, and the alarm signal after processing is connected with an alarm device through a wire connection. The alarm device receives an alarm signal through the wire and emits an acoustic and optical signal so that the wire manager knows that the underwater wire connection device has been damaged and broken, and that the alarm will cause a short circuit accident due to leakage of air. The alarm is installed in the monitoring place for the administrator.

Useful effects: timely and accurate know which underwater wire connection device inverted tank has been damaged, short-circuit, facilitate timely maintenance.

The disclosure relates to an underwater wire connection waterproof device, which includes an underwater wire connection waterproof device, which is also characterized by the installation of a suspension device composed of a rope and a floating balling ball on the top of the tank. The underwater wire connection device consists of a base, a clamping portion, a tank port, a tank neck groove, an inverted tank, and connecting portion for two wires in an inverted tank and close to the top of the tank. The rope is fixed at the top of an inverted tank and one end is fixed at the floating balling ball. The floating balling ball generates buoyancy in water and is fixed at one end of the rope. The suspension device consists of a rope and a floating balling ball.

Useful effect: when the underwater wire is connected to the waterproof device, the inverted tank mouth is always facing down, and the air inside the inverted tank is maintained.

The disclosure relates to an underwater wire connection waterproof device, which is characterized by its use. The purpose of the disclosure, using the technical scheme of the disclosure, is that other electrical equipment is also protected against waterproofing, including a drainage pump and a wire connection thereof through a tunnel. Electric motors and their wiring connections that need to work underwater. The battery, electrical appliance and electric wire connection of a car, electric car or electric car. The wire connection of the fountain. The city dweller power supply, street lamp power thorough underground cloth net.

Useful effects: underwater wire connection waterproof device, can be used in a wider range, service, ensure the safety of wire connection more places, better serve the people. The drainage water pump and its wire connection used in the underpass tunnel are not affected by the depth of rainwater accumulation. The use of electric motors and their wire connections that need to work underwater adds a way for electric motors to work underwater. Used in cars, electric vehicles, electric bottles, electrical appliances and their wire connections, there will be no blister cars, but also allow the car to drive in a certain depth of water. The wire connection of the fountain avoids the occurrence of electric leakage and electric shock accidents. The thorough underground distribution of power supply and street light supply for urban residents will no longer be used for power outages in heavy rain and typhoon weather.

DESCRIPTION OF THE DRAWINGS

In FIG. 1: base 1, clamping portion 2, connecting portion for two wires 3, tank port 4, tank neck groove 5, inverted tank 6.

In FIG. 2: base 1, clamping portion 2, connecting portion for two wires 3, tank port 4, tank neck groove 5, inverted tank 6, bracket 7, water-touching probe 8, signal processing device 9, alarm device 10.

In FIG. 3: base 1, clamping portion 2, connecting portion for two wires 3, tank port 4, tank neck groove 5, inverted tank 6, bracket 7, water-touching probe 8, signal processing device 9, air pump 11, conduit 12.

In FIG. 4: base 1, clamping portion 2, connecting portion for two wires 3, tank port 4, tank neck groove 5, inverted tank 6, bracket 7, chemical medicine 13, chemical medicine basket 14.

In FIG. 5: base 1, clamping portion 2, connecting portion for two wires 3, tank port 4, tank neck groove 5, inverted tank 6, bracket 7, water-touching probe 8, gas releasing device 16, air pressure tank 15.

In FIG. 6: base 1, clamping portion 2, connecting portion for two wires 3, tank port 4, tank neck groove 5, inverted tank 6, bracket 7, water-touching probe 8, signal processing device 9, water electrolysis device 17, electrode 18.

In FIG. 7: base 1, clamping portion 2, connecting portion for two wires 3, tank port 4, tank neck groove 5, inverted tank 6, portable motor 19, portable air pump 20, conduit 21, switch device 23, crutch-type air delivery pipe 22.

In FIG. 8: base 1, clamping portion 2, connecting portion for two wires 3, tank port 4, tank neck groove 5, inverted tank 6, block with gravity lighter than water 24.

In FIG. 9: base 1, clamping portion 2, circuit breaker 25, tank port 4, tank neck groove 5, inverted tank 6, insulation bracket 7.

In FIG. 10: base 1, clamping portion 2, connecting portion for two wires 3, tank port 4, tank neck groove 5, inverted tank 6.

In FIG. 11: base 1, clamping portion 2, connecting portion for two wires 3, tank port 4, tank neck groove 5, inverted tank 6, bracket 7, gas probe 26, signal processing device 9, alarm device 10.

In FIG. 12: base 1, clamping portion 2, connecting portion for two wires 3, tank port 4, tank neck groove 5, inverted tank 6, rope 27, floating ball 28.

DETAILED DESCRIPTION OF PREFERRED EMBODIMENTS

Figure 1:
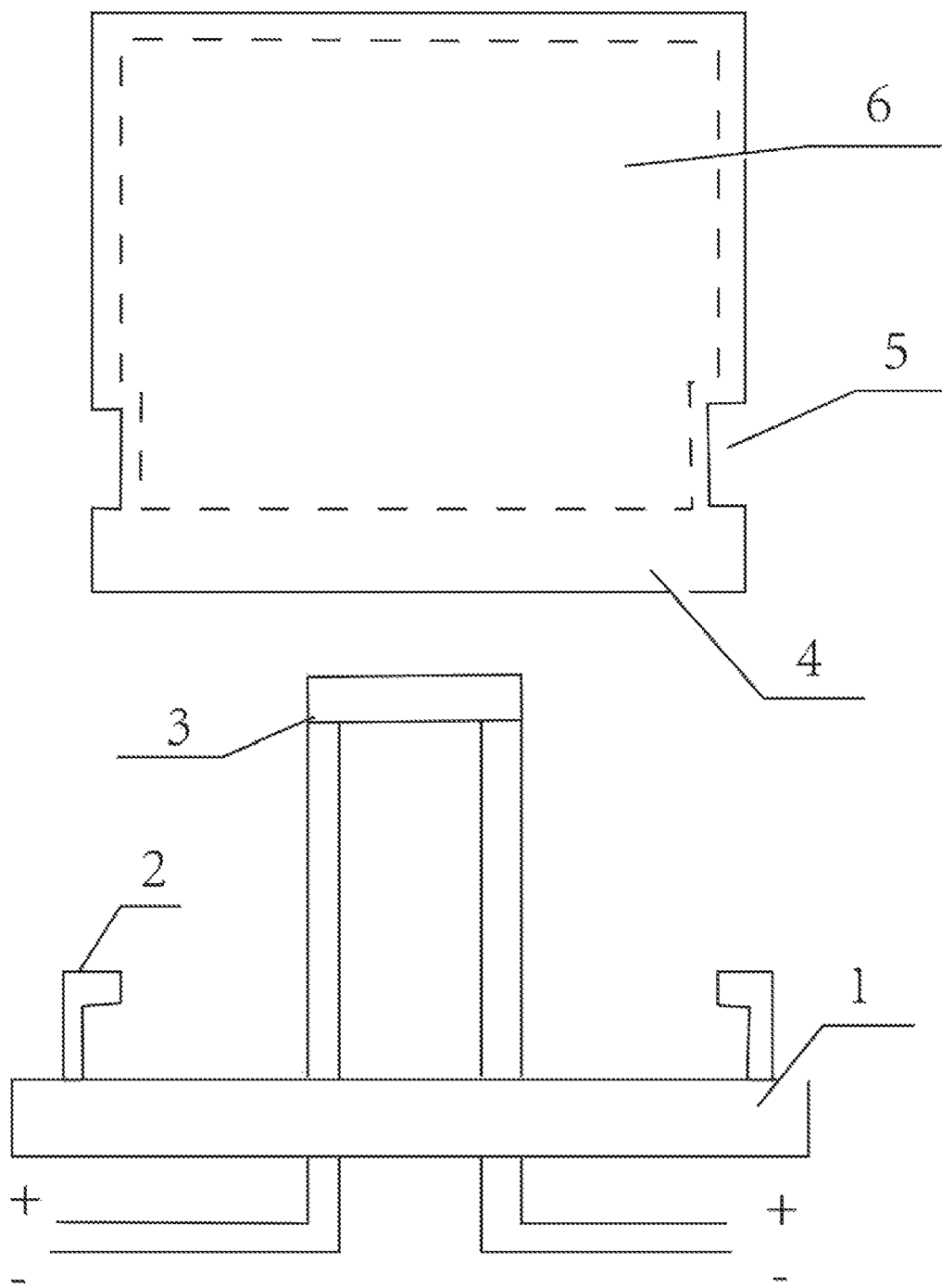
FIG. 1 is a structural diagram of an underwater wire connection waterproof device.
Figure 2:
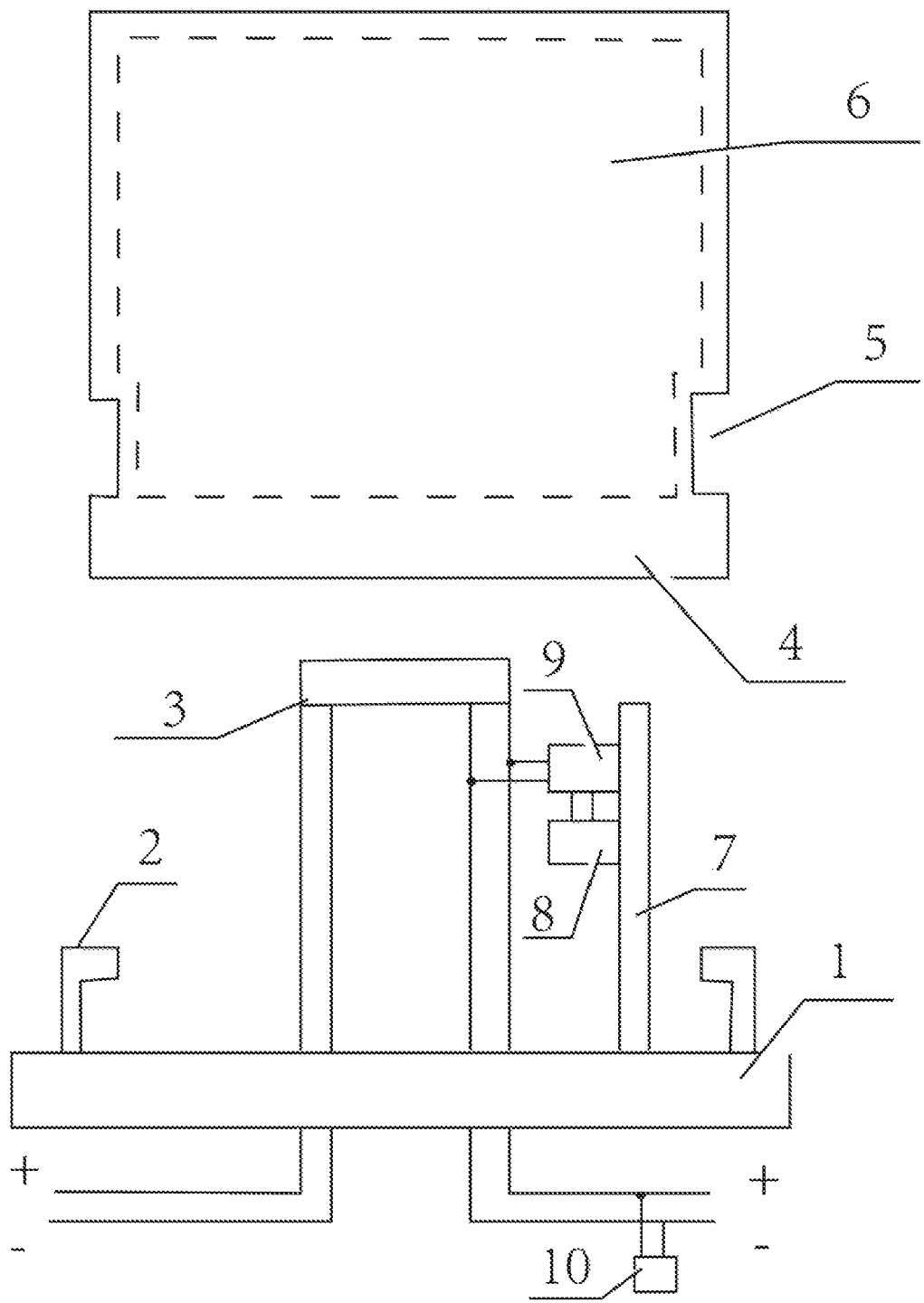
FIG. 2 is a structure diagram of a warning water level alarm device for underwater wire connection waterproofing device.
Figure 3:
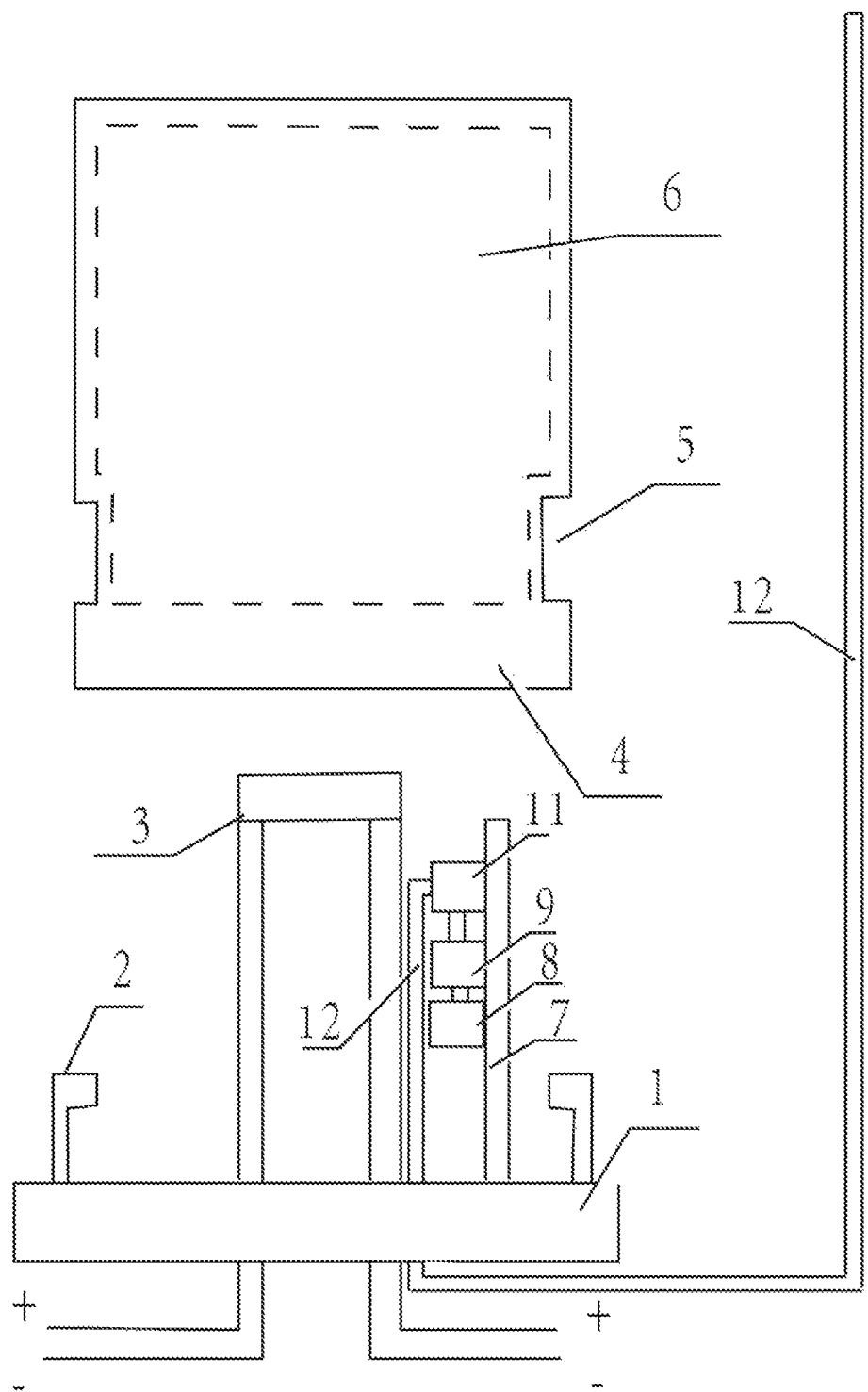
FIG. 3 is a structural diagram of an automatic air pump for underwater wire connection waterproofing device.
Figure 4:
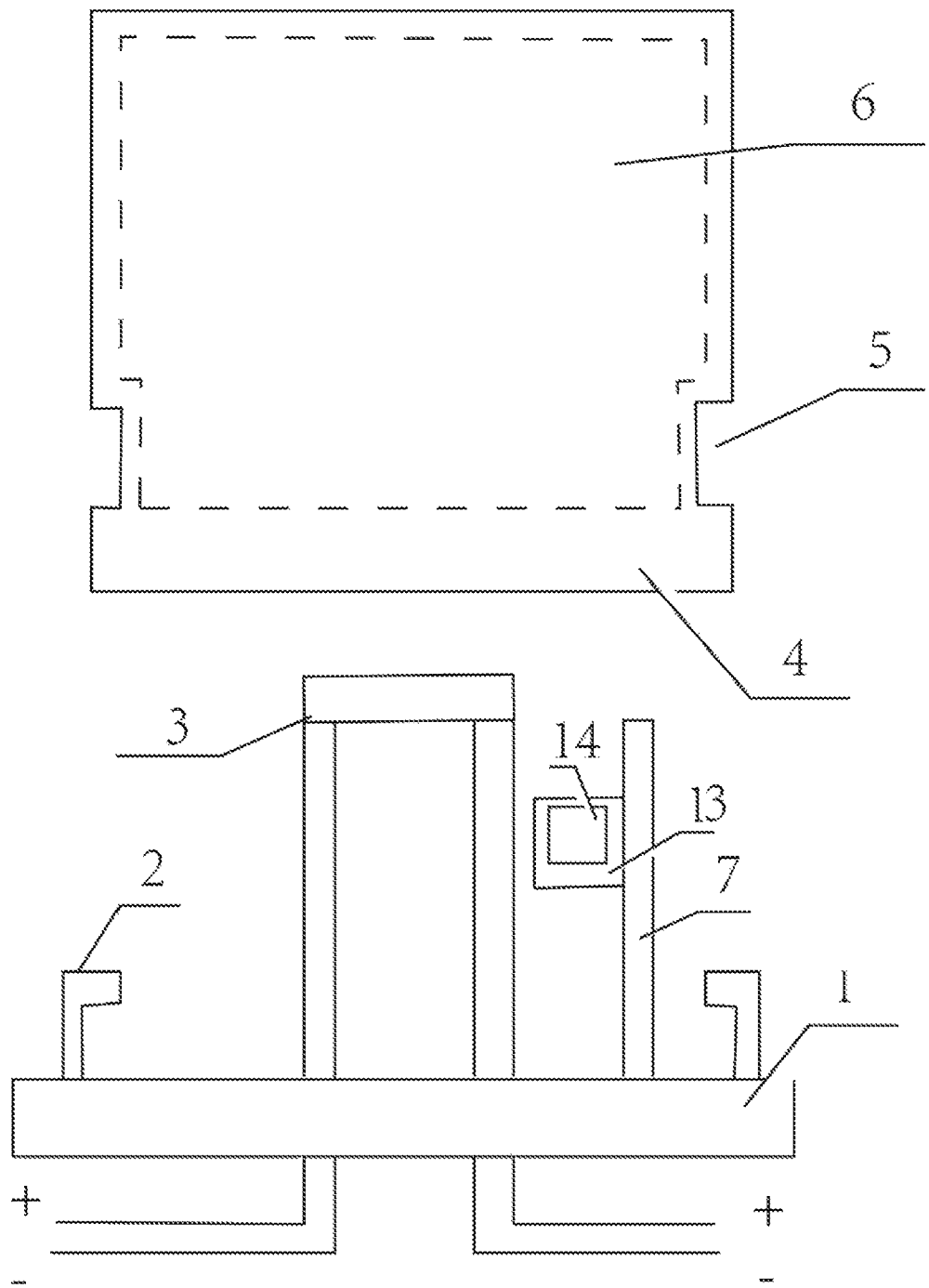
FIG. 4 is a schematic diagram of the structural location of the gas added by the built-in chemicals in the underwater wire connection device.
Figure 5:
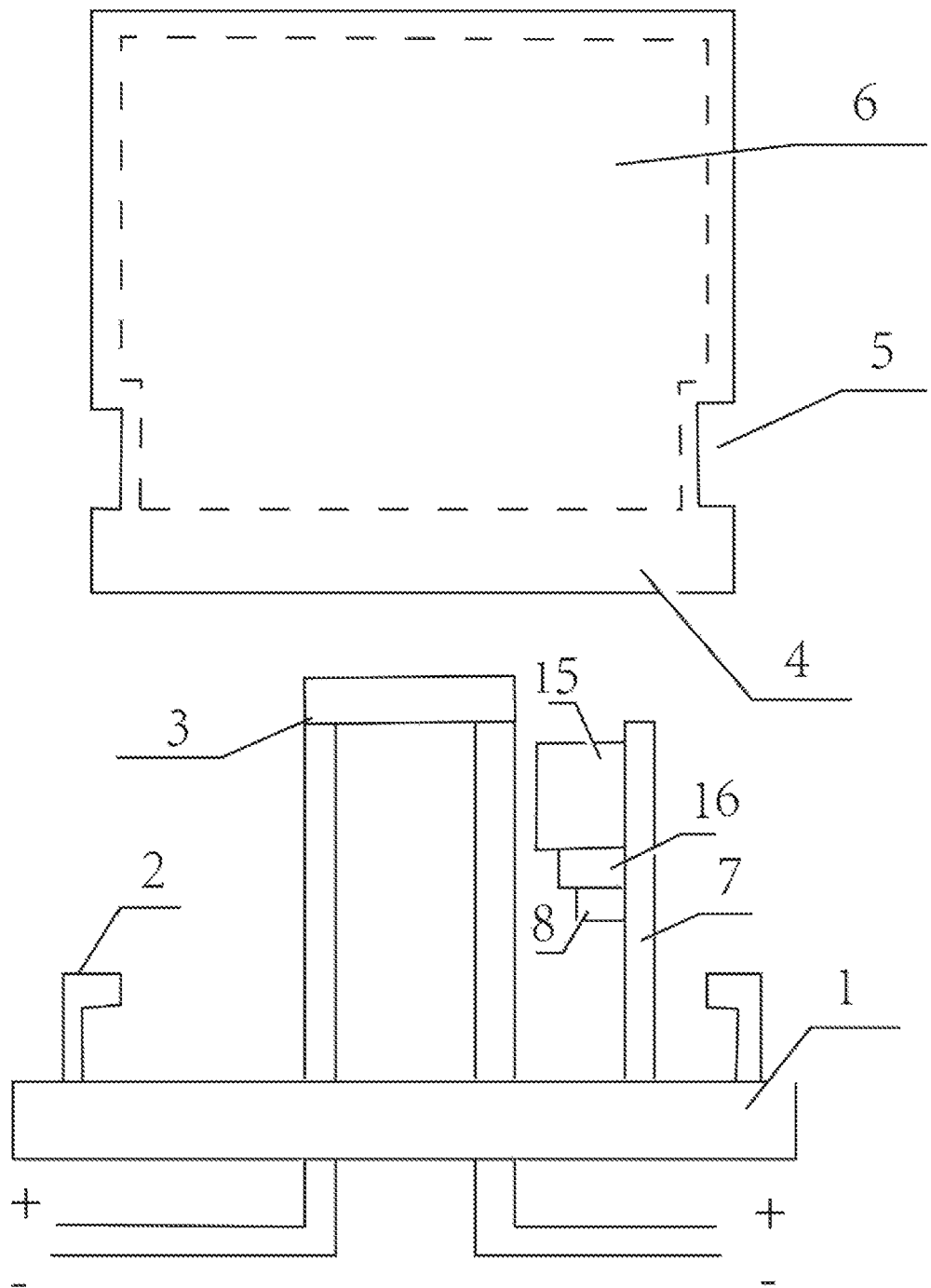
FIG. 5 is a schematic diagram of the structure of compressed gas filling for underwater wire connection waterproofing device.
Figure 6:
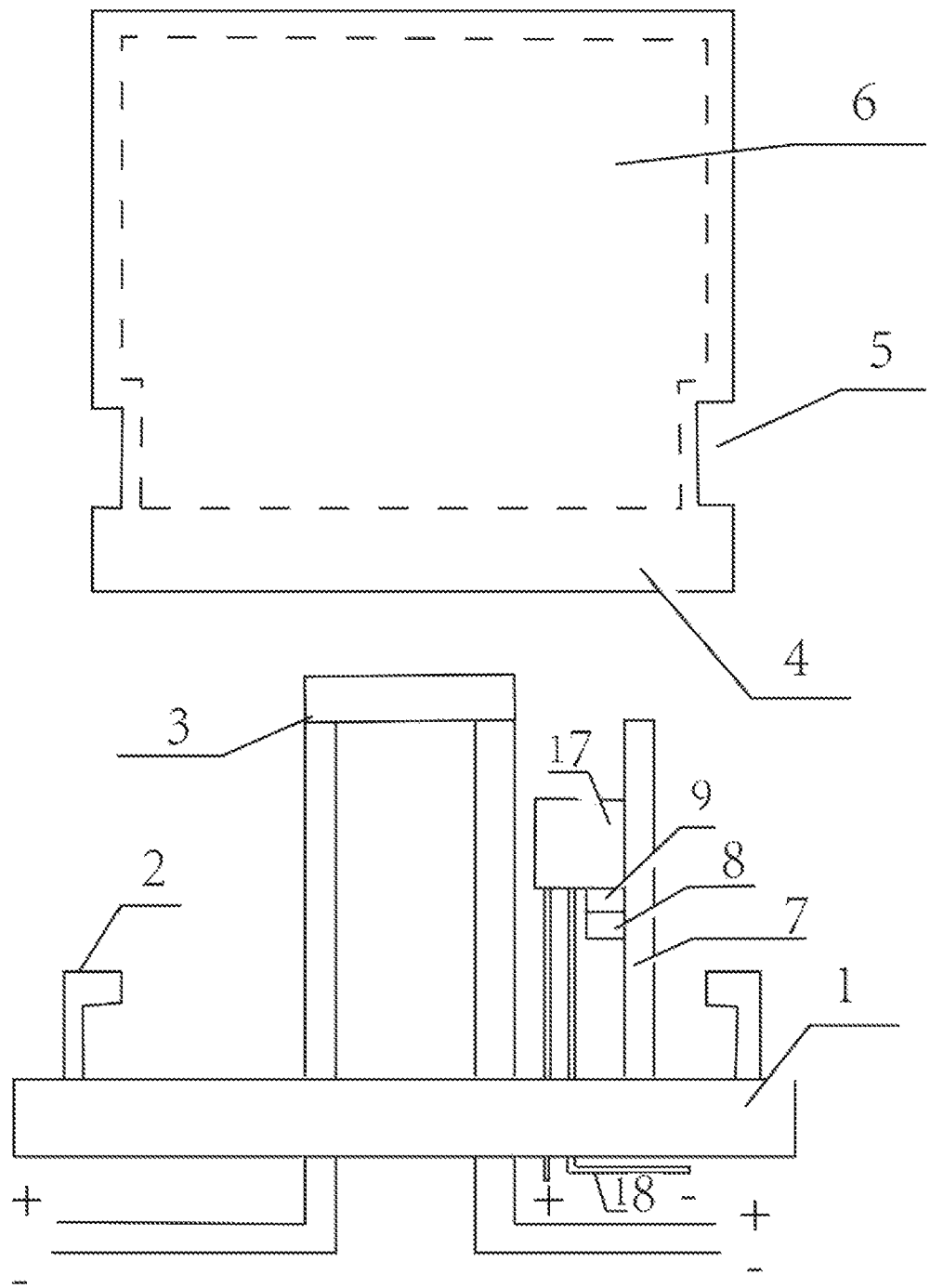
FIG. 6 is a structural diagram of the electrolysis of water for waterproofing of underwater wire connections.
Figure 7:
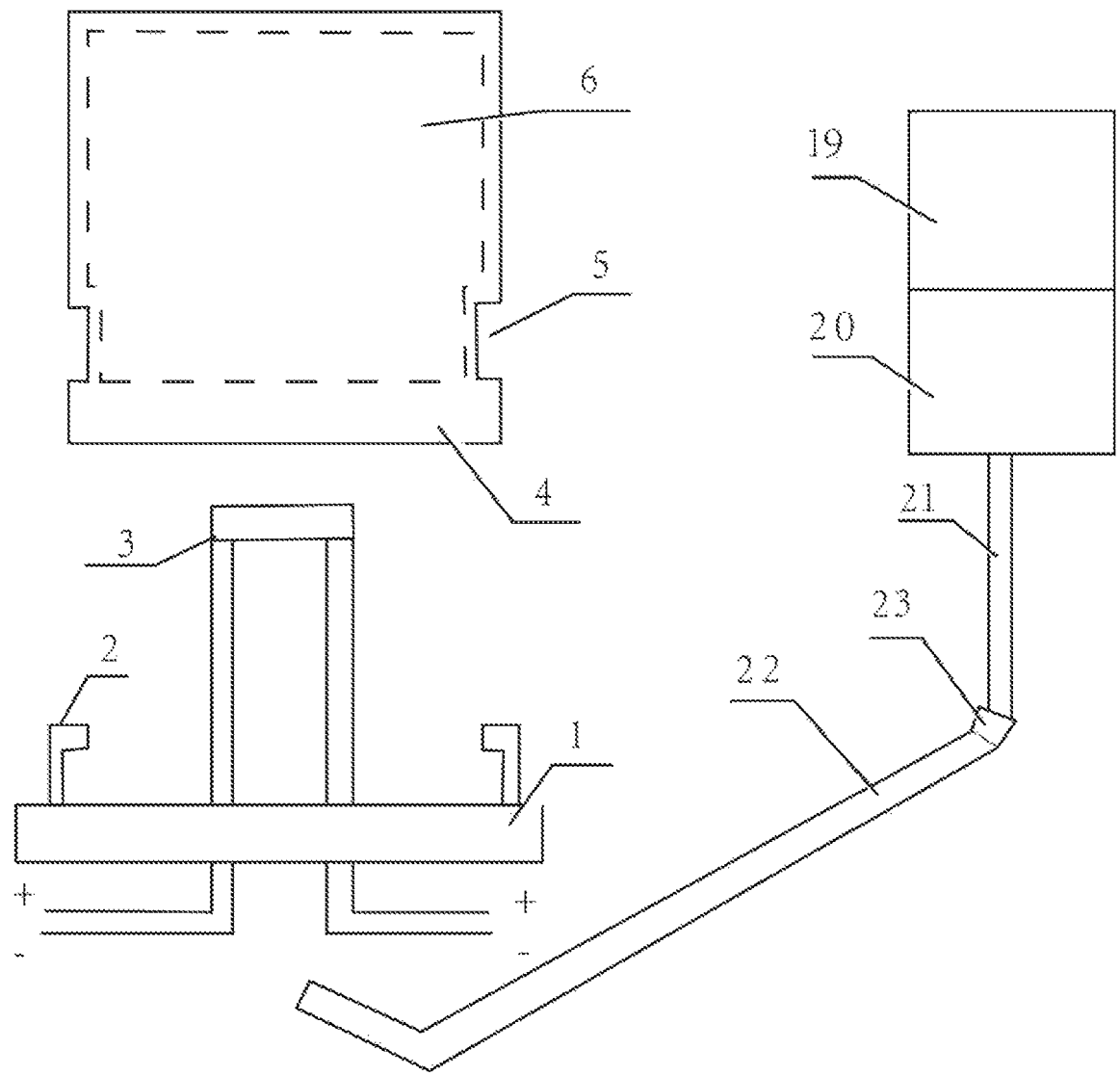
FIG. 7 shows the structural location of a portable inflatable device for underwater wire connection waterproofing.
Figure 8:
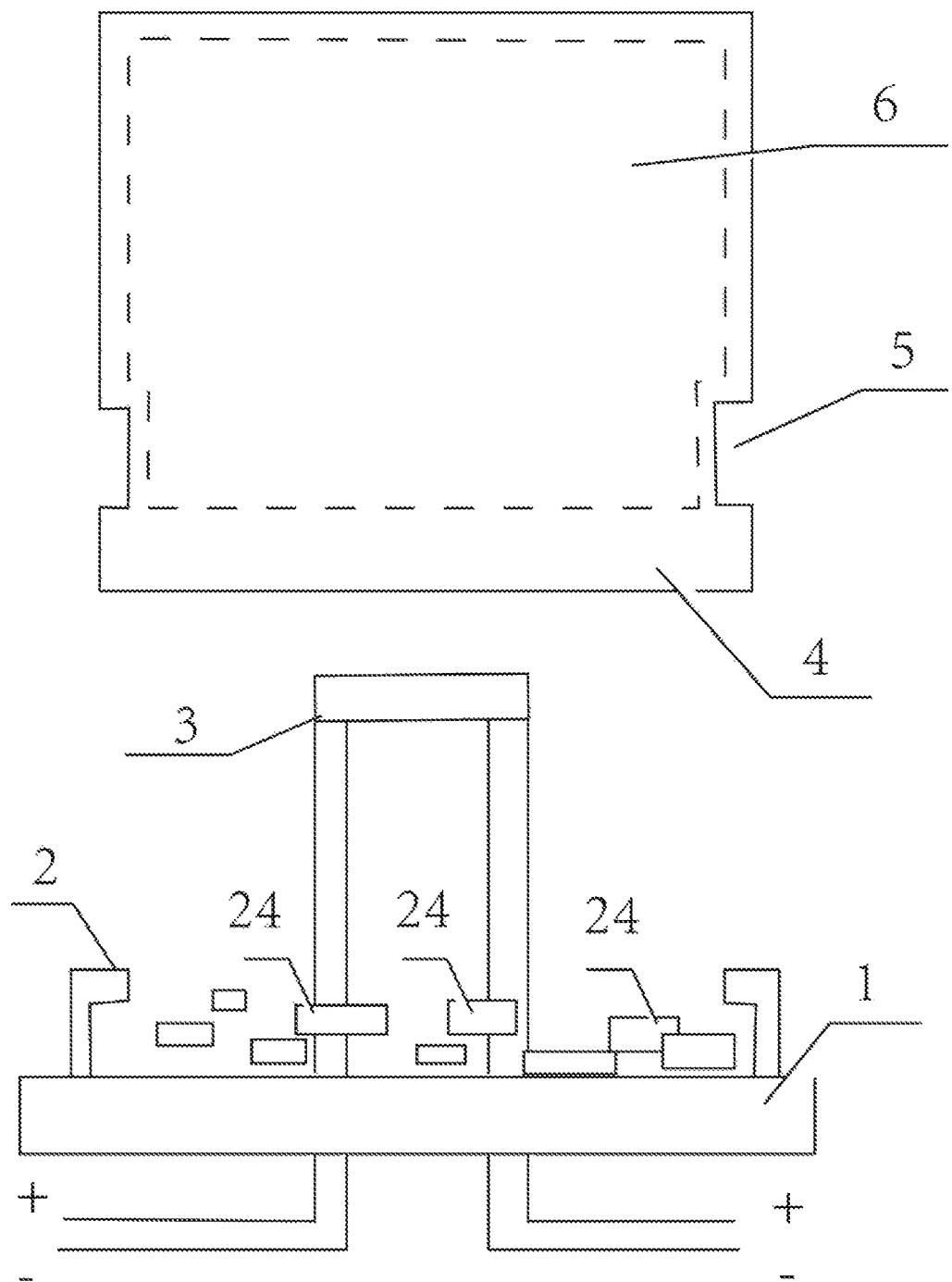
FIG. 8 shows the structural position of the water-resistant jump floating in an underwater wire connection waterproofing device.
Figure 9:
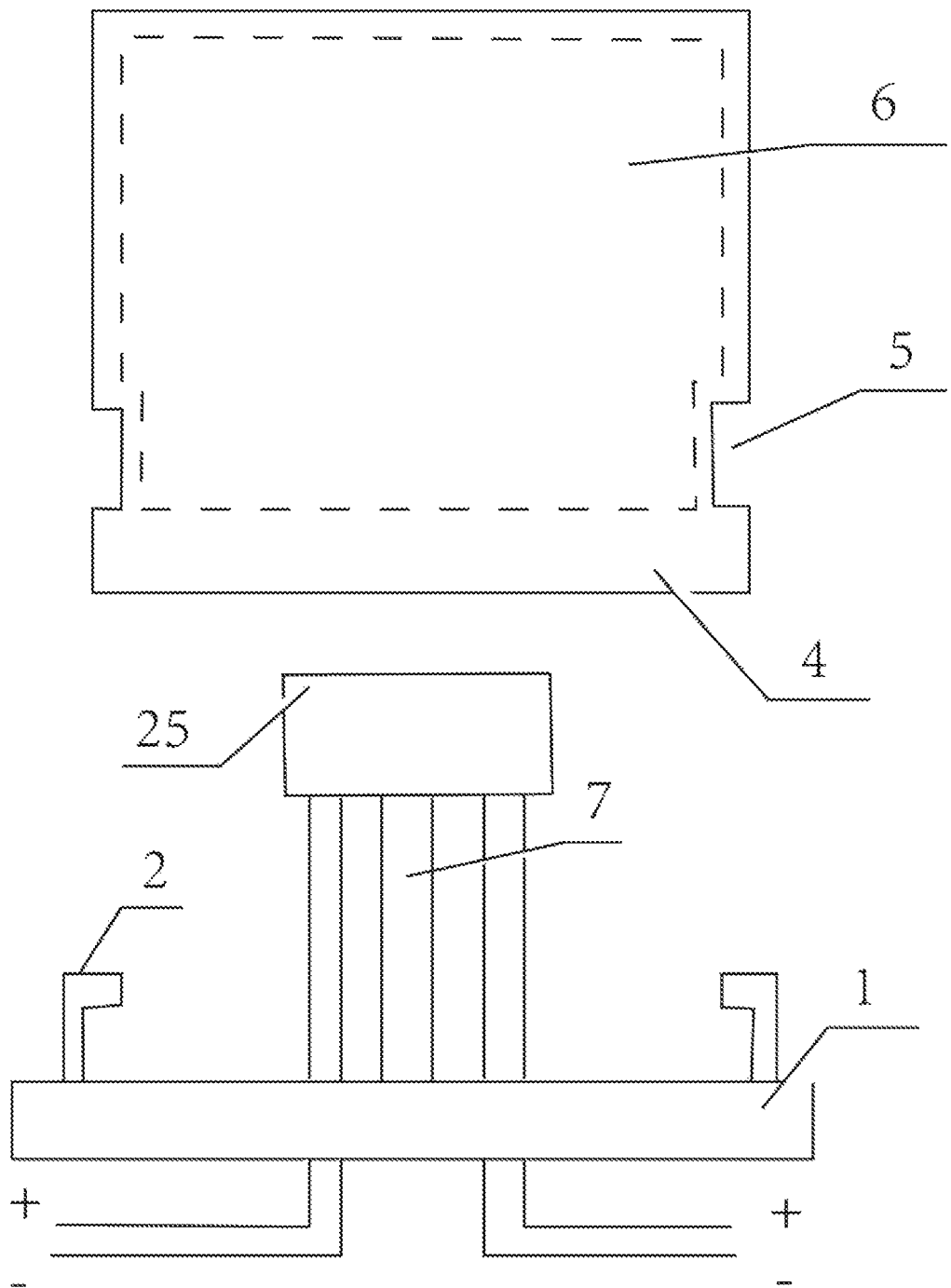
FIG. 9 is a schematic diagram of the structure of the underwater wire connection waterproof device with short circuit protection.
Figure 10:
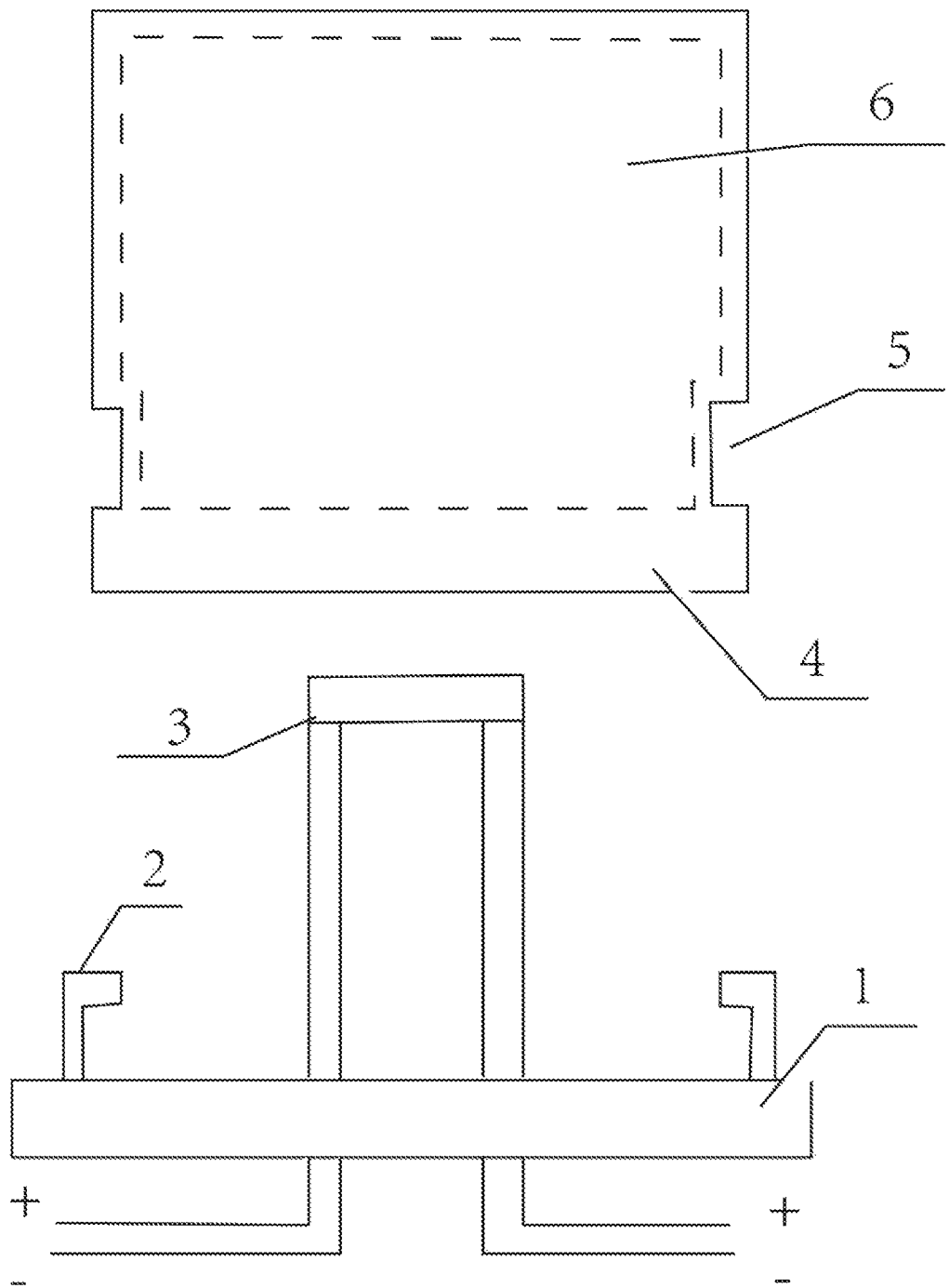
FIG. 10 is a structural diagram of the underwater wire connection waterproofing device for refueling.
Figure 11:
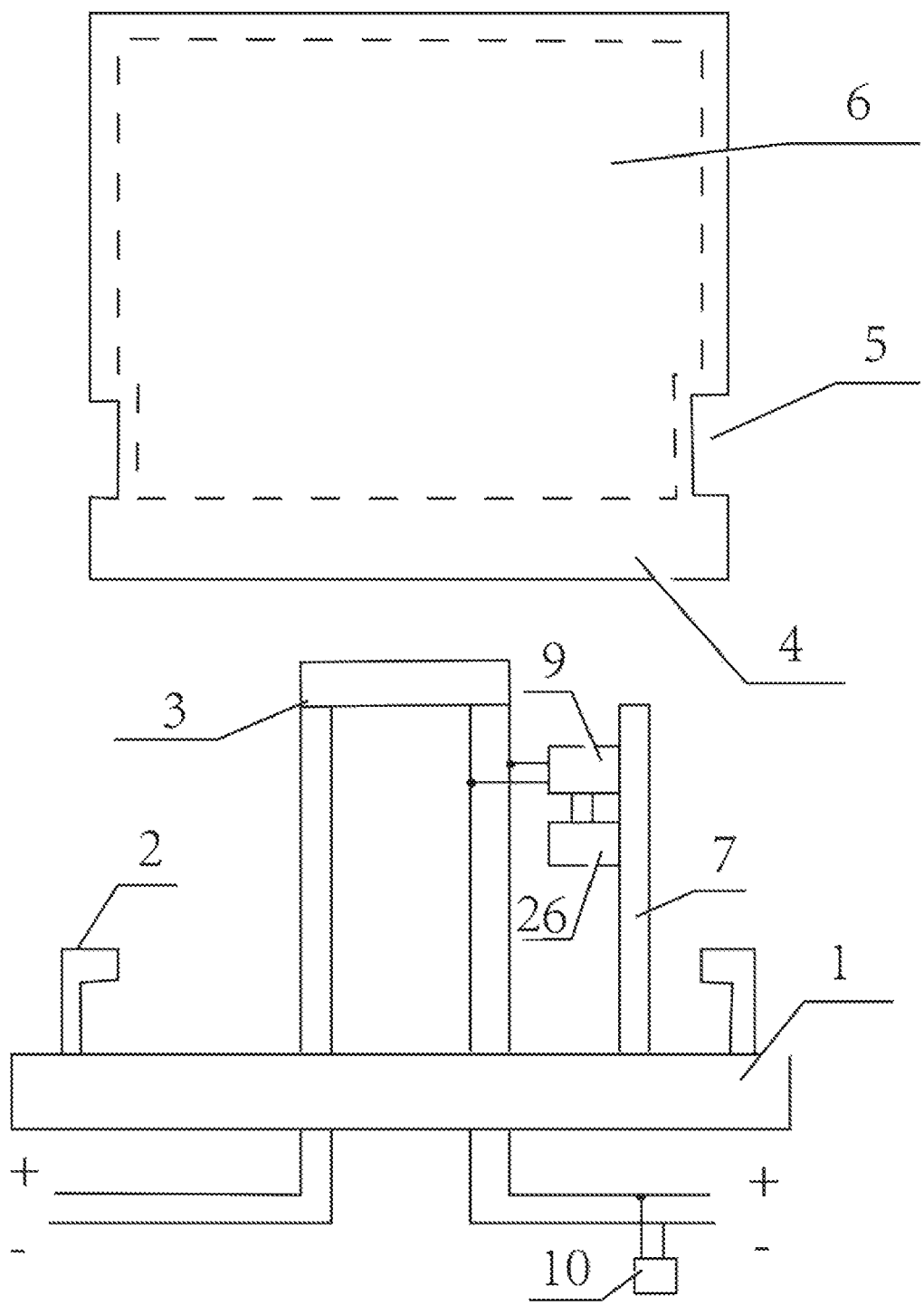
FIG. 11 is the structure diagram of the detection device in the underwater wire connection waterproofing device.
Figure 12:
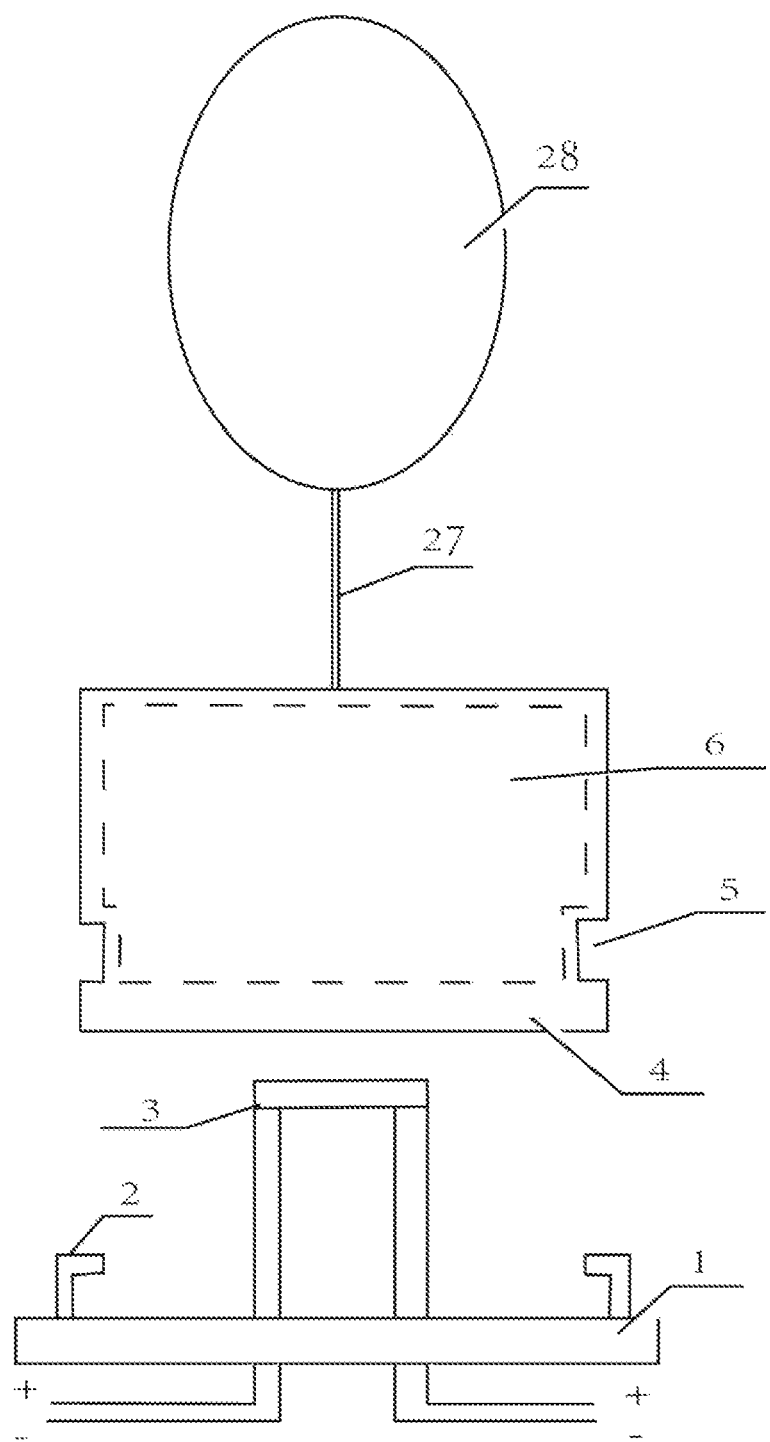
FIG. 12 shows the structural position of the device that has been facing down when the underwater wire connection waterproof device is put into the water.

The technical scheme in the embodiment of the disclosure is clearly and completely described in detail below, in conjunction with FIG. 1-FIG. 12, and it is clear that the embodiment described is only part of the embodiment of the disclosure. Not all embodiments. Based on the embodiment of the present disclosure, all other embodiments obtained by ordinary technicians in the field without creative labor are within the scope of protection of the present disclosure.

Specific Embodiment 1

The disclosure relates to an underwater wire connection waterproof device, which is characterized as: a base 1, a clamping portion 2, a tank port 4, a tank neck groove 5, an inverted tank 6, and connecting portion for two wires 3 in an inverted tank 6 and close to the top of the tank.

The embodiment is further arranged as follows: the connecting portion for two wires 3 are located in inverted tank 6 and close to the top of the tank, and are two power transmission lines with intact insulation layer, one end of the wire is penetrated from the tank port 4 and is in inverted tank 6. Connect the head and close to the top of the top. The base 1 is fixed on the ground itself, and fixed wire and inverted tank 6. The clamping portion 2, the bottom is fixed on the base 1, and the self is stuck into the tank neck groove 5. The tank port 4, is in contact with the base 1. The tank neck groove 5, located at the neck above tank port 4 of the inverted tank 6, matches with the clamping portion 2. The inverted tank 6 is a tank that is erected face down, except for the tank port 4 and the outside, and the other parts are closed.

This device is the basic device, hereinafter referred to as: underwater wire connection device.

The embodiment is further arranged as follows: according to an underwater wire connection waterproof device, the characteristic of which is that the connecting portion is connected by a standard joint type. The connecting part is connected by a standard joint type, which is a connection of two wires, which is connected by an electrician standard joint method.

The embodiment is further arranged as follows: according to an underwater wire connection waterproof device, the characteristic of which is that the connection of the connecting portion is a junction plate type. The connecting portion is connected by a wiring plate type, two wires are respectively fixed to the same conductive metal with screws, two wires are connected, and the wiring plate structure is fixed on the insulation bracket.

The embodiment is further arranged as follows: according to an underwater wire connection waterproof device, its characteristic is that the connection of the connecting portion is a plug-in connection. The Jack joint is a method of connecting two electric wires according to the electrician standard.

Working principle: Base 1 is fixed on the ground, and the clamping portion 2 is fixed. After the wire is connected as required, the inverted tank 6 is put down, and the clamping portion 2 is stuck in the tank neck groove 5 to fix the inverted tank 6. The inverted tank 6 is transparent. The situation of tank 6 can be seen without removing the inverted tank 6. The two wires are connected well, and the connecting portion 3 is as close as possible to the top of the inverted tank 6, and then the wire is fixed on the base 1. The wire is an intact wire with an insulating layer. When the water is diffused through the tank port 4, the connecting portion for two wires 3 is higher than the water surface, and it will not be in contact with the water and can be safely energized. When the water is diffused over the top of the inverted tank 6, due to the inverted tank 6, except for the tank port 4 and the outside connection. Other parts are closed. Water cannot directly enter the inverted tank 6. It is only through the tank port 4. The inverted tank 6 is full of air at this time, and the water cannot enter. Only deep enough water produces enough pressure to compress the air inside the inverted tank 6. Water can enter inverted tank 6 in sufficient quantities, but the disclosure is applicable to shallow water, so the water will never diffuse beyond the height of connecting portion for two wires 3, and the connecting portion for two wires 3 will not come into contact with water and can be safely energized. The connection method of the wire can be the method of connecting the two wires according to the electrician's standard, and the naked wire of the wire head can be inter-wound with each other. It can also be a plug-in connection or a junction type connection.

Specific Embodiment 2

An underwater wire connection waterproof device, including an underwater wire connection device, is also characterized by further comprising a bracket 7, a water-touching probe 8, a signal processing device 9, and an alarm device 10.

The embodiment is further arranged as: an underwater wire connection device consisting of a base 1, a clamping portion 2, a tank port 4, a tank neck groove 5, an inverted tank 6, and connecting portion for two wires 3 in the inverted tank 6 and close to the top of the tank. The bracket 7 is columnar, the bottom is fixed on the base 1, and the upper part is fitted with a water-touching probe 8 and a signal processing device 9. The water-touching probe 8, which is mounted on a bracket 7, is a device that contacts water and leads it, and is connected with an alarm device 10. The signal processing device 9 is mounted on a bracket and the signal input is connected with a water-touching probe 8, and the processed alarm signal is connected with an alarm device through a wire connection. The alarm device 10, which receives an alarm signal over the wire, emits a sound and light signal, and allows the wire manager to know that the underwater wire connection device has no alarm to enter the water and is installed in the supervisor's monitoring place.

Working principle: when the water diffuses to the water-touching probe, the water-touching probe leads, the signal is transmitted to the signal processing device, the alarm signal is transmitted to the alarm, and the alarm is issued an alarm action to let the manager know that the underwater wire is connected to the waterproof device and has entered the water. The installation position of the water-touching probe in the bracket determines the safety height of the diffuse water.

Specific Embodiment 3

An underwater wire connection waterproof device, including an underwater wire connection device and a warning water level, is also characterized by a method of increasing the amount of air in an inverted tank.

The embodiment is further arranged as: the underwater wire connection device comprises a base, a clamping portion, a tank port, a tank neck groove, an inverted tank, and connecting portion for two wires in an inverted tank and close to the top of the tank. The warning water level, when the water in the tank spreads to this position, the water will immediately diffuse to the position of a safe point water level that causes a short circuit at the wire connection. The amount of air in an inverted tank is increased, that is, air is poured into an inverted tank.

Working principle: when the underwater wire connection waterproof device is under water, because the water has flooded through the inverted tank, there is pressure in the tank, the air in the tank will shrink, and the water level in the tank will rise. If the pressure is too large and the water level is too high, the safety of the underwater wire connection waterproof device will be affected. At this time, air will be injected into the inverted tank, so that the water level in the tank will drop, and the underwater wire connection waterproof device will work properly. It would eliminate this security risk.

Specific Embodiment 4

According to a method of increasing the amount of air in an inverted tank with an underwater wire connection waterproof device. It is characterized by further including a bracket 7, a warning water-touching probe 8, a signal processing device 9, an air pump 11, and a conduit 12 in the tank, to form an automatic air increase device.

The embodiment is further arranged as follows: the bracket 7 is mounted on the base 1 and carries a water-touching probe 8, a signal processing device 9 and an air pump 11. The conduit 12, an inlet of an air pump 11, the other end of which is erected through the bottom of the tank to the outside of the tank 6, and is higher than the bottom of the tank. The air pump 11, mounted on a bracket 7, is generally a pumping device. The warning water-touching probe 8 is mounted on a bracket 7 and the installation position is the warning water level position. The output signal of the probe 8 is connected to the signal processing device 9. The signal processing device 9 is mounted on a bracket 7 and receives a water diffuser signal from a water-touching probe 8, and the air pump 11 is operated for a fixed time.

How it works: As the water surface rises, the submerged wire is connected to the waterproof tank 6, the pressure in the tank 6 will increase, and the internal air will shrink and shrink as the pressure increases. The water level in the tank 6 is also constantly increasing. When the water level reaches the alert position, the water-touching probe 8 detects and sends a signal. After the signal processing device 9 receives this signal. When the start order is issued, the air pump 11 begins to work for a certain period of time. The air will enter the tank 6 from the conduit 12, and the air inside the tank will be automatically increased. The following technical solutions are used: including underwater wire connection waterproof devices, which are also characterized by further comprising brackets 7 in tank 6, chemical medicines 13, and chemical medicine basket 14.

Specific Embodiment 5

According to a method of increasing the amount of air in an inverted tank with an underwater wire connection waterproof device, it is characterized by further comprising the bracket 7, chemical medicines 13, and chemical medicine basket 14 in the tank.

The embodiment is further arranged as follows: the bracket 7 is arranged on a base 1 and carries the chemical medicine basket. The chemical medicine 13 is a gas that becomes a gas in contact with water and the gas is not conductive. The chemical medicine basket 14 is arranged on a warning water level of a bracket 7 and is loaded with a chemical medicine 13.

How it works: As the water surface rises, the submerged wire is connected to the waterproof tank 6, the pressure in the tank 6 will increase, and the internal air will shrink and shrink as the pressure increases. The water level in the tank 6 is also constantly increasing. When the water level rises to the chemical medicine 13, the chemical medicine 13 releases gas when it encounters water, and automatically increases the air in the tank.

Specific Embodiment 5

According to the method of increasing the amount of air in the inverted tank according to the underwater wire connection waterproof device, it is characterized by further comprising a bracket 7, an air pressure tank 15, a gas releasing device 16, and a water-touching probe 8.

The embodiment is further arranged as follows: the bracket 7 is mounted on the base 1 and carries an air pressure tank 15 and a water-touching probe 8. The air pressure tank 15 is arranged on a bracket 7, a fixed gas releasing device 16 on an air pressure tank 15, and a non-conductive compressed gas is contained in the air pressure tank 15. The gas releasing device 16 is fixed on the air pressure tank 15 and is connected to the exhaust pipe of the tank 15, and receives a signal from the water-touching probe 8 and makes corresponding actions. The water-touching probe 8 is fixed on the bracket 7, and water is also present in the tank 6 when there is water outside the tank 6 and it diffuses through the tank port 4. When the water reaches the warning level, the water-touching probe 8 sends a signal and the signal is sent to the gas releasing device 16.

Working principle: As the water surface rises, the submerged wire is connected to the waterproof tank 6, the pressure in the tank 6 will increase, and the internal air will shrink and shrink as the pressure increases. At the same time, the water level within the tank 6 is also constantly increasing. When the water level rises, to the alert position, the water-touching probe 8 will detect and send a signal. After the gas releasing device 16 receives this signal, it will issue a release command. Air pressure tank 15 releases a certain amount of gas, and automatically increases the air in the tank 6.

Specific Embodiment 6

Based on the method of increasing the amount of air inside the inverted tank, the underwater wire connection waterproof device is used. It is characterized by further comprising a bracket 7, a water electrolysis device 17, an electrode 18, a water-touching probe 8, and a signal processing device 9.

The embodiment is further arranged as follows: the bracket 7 is mounted on the base 1 and carries a water electrolysis device 17, a water-touching probe 8, and a signal processing device 9. The water electrolysis device 17 is arranged on a bracket 7 in a tank and has 2 electrodes 18. The electrode 18, a part of a water electrolysis device 17, is located outside the tank port 4, and an electrode 18 is located below the tank port 4. The other electrode 18 is outside the range below the tank port 4. The water-touching probe 8, which is mounted on the bracket 7 and spreads to the water level in the tank 6 when there is water outside the tank 6, and when the water reaches the warning water level, the water-touching probe 8 emits signals. The signal processing device 9 is mounted on the bracket 7, receives a signal from the water-touching probe 8 that the water diffuser has reached the warning water level, and activates the water electrolysis device 17 to work for a fixed time.

How it works: As the water surface rises, the submerged wire is connected to the waterproof tank 6, the pressure in the tank 6 will increase, and the internal air will shrink and shrink as the pressure increases. The water level in the tank 6 is also constantly increasing. When the water level reaches the alert position, the water-touching probe 8 detects and sends a signal. After the signal processing device 9 receives this signal. The start command is issued, the water electrolysis device 17 begins to work for a certain period of time, and oxygen will be generated from the electrode 18 and enter the tank 6. Hydrogen is generated from the electrode 18 and excluded from the tank 6, and the air, inside the tank is automatically increased.

Specific Embodiment 7

According to the method of increasing the amount of air in the inverted tank according to the underwater wire connection waterproof device, it is characterized by further comprising a portable motor 19, a portable air pump 20, a conduit 21, a crutch-type air delivery pipe 22, and a switch device 23 consisting of a portable inflatable device.

The embodiment is further provided as follows: the portable motor 19 is connected with the portable air pump 20 to provide power for the portable air pump 20. The portable air pump 20 is connected with the portable motor 19, an outlet of the portable air pump is connected with the conduit 21, and is pressurized and stored air. The conduit 21, one end is arranged on the portable air pump 20 and one end is connected with the switch device 23 on a crutch-type air delivery pipe 22. The crutch-type air delivery pipe 22, tubular, one end is connected with a conduit 21 through a switch device 23, and one end is a curved shape of a crutch. The switch device 23, the release of compressed gas from the switch, is arranged on a crutch-type air delivery pipe 22, and is connected with the conduit 21. The portable inflatable device comprises the portable motor 19, the portable air pump 20, the conduit 21, the crutch-type air delivery pipe 22 and the switch device 23.

Working principle: The start of the portable motor 19 provides power for the portable air pump 20, the portable air pump 20 compresses the air and stores it, passes the conduit 21, connects the crutch-type air delivery pipe 22, and sends no air. It is realized by a human-controlled switch device 23.

Specific Embodiment 8

An underwater wire connection waterproofing device, including an underwater wire connection waterproofing device, is also characterized by the placement of several shallower blocks 24 on the base.

The embodiment is further arranged as follows: the underwater wire connection waterproof device consists of a base 1, a clamping portion 2, a tank port 4, a tank neck groove 5, an inverted tank 6, and connecting portion for two wires 3 in an inverted tank 6 and close to the top of the tank. A few blocks 24 with lighter specific gravity than water are placed on the base. In terms of specific gravity, they are lighter than water, but the specific gravity is 0.7-0.9 which is the best. The number of blocks meets that: when floating on the surface of the tank 6, it basically covers the surface of the tank 6.

Working principle: as the water surface rises, the submerged wire is connected to the waterproof tank 6, the pressure in the tank 6 will increase, and the air inside the tank will decrease as the pressure increases. The water in the tank 6 rises to a certain extent, and the lighter block 24 also floats on the water surface. When there is a vibration, there is no floating block 24 on the water surface that will spatter the water. After there is a floating block on the water surface. The amount of splash will be greatly restrained, so that the water will not be splashed on the wire, causing the connecting portion for two wires 3 to conduct each other and short-circuit, causing the underwater wire connection waterproof device to lose its due effect.

Specific Embodiment 9

An underwater wire connection waterproof device, including an underwater wire connection waterproof device, is also characterized by further comprising a bracket 7 and a circuit breaker 25.

The embodiment is further arranged as follows: the underwater wire connection waterproof device consists of a base 1, a clamping portion 2, a tank port 4, a tank neck groove 5, an inverted tank 6, and connecting portion for two wires 3 in an inverted tank 6 and close to the top of the tank. The bracket 7, the lower end is fixed on the base 1 and the circuit breaker 25 is fixed above. The circuit breaker 25, which is fixed on the bracket 7, is an anti-leakage device of an existing technology, and has an input and output end connected with a wire, and the normal state is in conduction.

How it works: When a short circuit occurs in the water connection waterproof device behind the underwater wire, the circuit breaker 25 fires in time and immediately cuts off the power to protect the underwater wire connection. The waterproof device and the previous wire are still conductive.

Specific Embodiment 10

An underwater wire connection waterproof device, including an underwater wire connection waterproof device, is also characterized by filling the tank with lighter oil than water.

The embodiment is further arranged as follows: the underwater wire connection waterproof device consists of a base 1, a clamping portion 2, a tank port 4, a tank neck groove 5, an inverted tank 6, and connecting portion for two wires 3 in an inverted tank 6 and close to the top of the tank. The oil is lighter than water in the tank 6, and the oil is poured into the tank 6. The perfusion position is at least to the protected position, and the perfusion oil has the characteristics of lighter and insulation than water.

Working principle: The underwater wire in the water is connected to the waterproof device. The safest thing is to inject light and insulated oil into the inverted tank 6. It can be filled, but at least infused into the protective position. After the lighter and insulated oil is injected into the inverted tank 6, the connecting portion for two wires 3 in the inverted tank will be tightly wrapped in all directions by the oil, and the wires will not be connected to each other, and the underwater wire will be connected to the waterproof device to work normally.

Specific Embodiment 11

An underwater wire connection waterproof device, including an underwater wire connection device, is also characterized by further comprising external safety protection devices.

The embodiment is further arranged as follows: the underwater wire connection waterproof device consists of a base, a clamping portion, a tank port, a tank neck groove, an inverted tank, and connecting portion for two wires in an inverted tank and close to the top of the tank. The external safety protection device is mounted on a protective protection layer outside an underwater wire connection waterproof device, the shape is a gentle bulge, and the raised interior is an underwater wire connection waterproof device. The protective layer may be a mesh or a sheet, and the protective layer material has a strong water resistance feature.

Working principle: when the underwater wire connection waterproof device is installed in the river channel or in the sea, it may be damaged by the boat, trawl, etc. The damage is generally caused by hanging or breaking. When the underwater wire is connected to the waterproof device with a protective layer, you can't touch the underwater wires and connect to the waterproof device.

Specific Embodiment 12

An underwater wire connection waterproof device, including an underwater wire connection device, is also characterized by further comprising a bracket 7, a gas detection gas, a gas probe 26, a signal processing device 9, and an alarm device 10.

The embodiment is further arranged as follows: the underwater wire connection waterproof device consists of a base 1, a clamping portion 2, a tank port 4, a tank neck groove 5, an inverted tank 6, and connecting portion for two wires 3 in an inverted tank 6 and close to the top of the tank. The bracket 7 is mounted on the base 1 and carries a gas probe 26 and a signal processing device 9. The detected gas, which is filled into an inverted tank 6 in a working state, has the characteristics of lighter specific gravity than air, easier detection and higher safety. The gas probe 26, which is mounted on a bracket 7, is a device that sends an alarm signal without detecting the detected gas, and is connected to a signal processing device 9. The signal processing device 9 is mounted on a bracket 7, the signal input is connected with a gas probe 26, the processed alarm signal is connected to the alarm device 10 through a wire connection. The alarm device 10, which receives an alarm signal over the wire, emits a sound and a light signal, so that the wire manager knows that the underwater wire connection device is damaged and broken, and that the alarm will cause a short-circuit accident due to air leakage. The alarm is installed in the supervisor's monitoring place.

How it works: When an inverted tank 6 is broken, the detected gas in the tank 6 will leak, the gas probe 26 will not detect the detected gas, and the gas probe 26 will send an alarm signal. The signal is transmitted to the signal processing device 9 and the signal processing device 9 emits an alarm signal. The signal passes through the wire and is transmitted to the alarm device 10. The alarm device 10 will alarm.

Specific Embodiment 13

An underwater wire connection waterproof device, including an underwater wire connection waterproof device, is also characterized by further comprising a suspension device consisting of a rope 27 and a floating ball 28 on the top of the tank 6.

The embodiment is further arranged as follows: the underwater wire connection waterproof device consists of a base 1, a clamping portion 2, a tank port 4, a tank neck groove 5, an inverted tank 6, and connecting portion for two wires 3 in an inverted tank 6 and close to the top of the tank. The rope 27 is fixed at one end to the top of an inverted tank 6 and one end is fixed at the floating ball 28. The floating ball 28 generates buoyancy in the water and is fixed at one end of the rope 27. The suspension device consists of a rope 27 and a floating ball 28.

Working principle: when the underwater wire is connected to the waterproof device and put directly to the bottom of the water, during the descent, due to the resistance of the water, the inverted tank 6 will shake left and right, under the action of the buoyancy of the floating ball 28. The rope 27 will produce an upward pull on the left and right pendulum tank 6. The suspension device will greatly reduce the swing of tank 6, and the tank port 4 will not release the air in tank 6. The tank port 4 will always face down.

Specific Embodiment 14

The disclosure relates to an underwater wire connection waterproof device, which is also characterized by its use.

This embodiment is further set to: using the above technical solutions, other electrical equipment is also protected against waterproofing, including: drainage pumps and wire connections through tunnels. Electric motors and their wiring connections that need to work underwater. The battery, electrical appliance and electric wire connection of a car, electric car or electric car. The wire connection of the fountain. The city dweller power supply, street lamp power thorough underground cloth net.

Working principle: Change the shape and size of the tank, so that the object of protection is above the warning water level of the tank. As the water surface rises, the underwater wire is connected to the tank port of the waterproof device, but the water level in the tank is below the alert position, and the underwater wire connection waterproof device protects the protected electrical appliances.

The above description of the disclosed embodiment enables specialized technical personnel in the field to realize or use the disclosure. Various modifications to these embodiments will be obvious to the professional and technical personnel in the field, and the general principles defined in this article may be implemented in other embodiments without departing from the spirit or scope of the present disclosure. Therefore, the disclosure will not be limited to the embodiments shown in this article, but will conform to the widest range consistent with the principles and novel features disclosed in this article.

I claim:

1. An underwater electric wire connection waterproof device, comprising a base, a clamping portion, a tank port, a tank neck groove, an inverted tank and an external safety device, wherein, a connecting portion for two electric wires is located in the inverted tank and is close to an upper part of the inverted tank; the two electric wires are two electric power transmission lines whose insulating layers are intact, and electric leads at one end of the two electric wires are penetrated from the tank port to be located in the inverted tank and are close to the upper part of the inverted tank after being connected to the connecting portion; the base is fixed on a ground and the electric wires and the inverted tank are fixed to the base; a bottom of the clamping portion is fixed on the base, a top of the clamping portion latches the tank neck groove; the tank port contacts with the base; the tank neck groove is located at a neck on the tank port of the inverted tank and matched with the top of the clamping portion; the inverted tank is a tank whose port is, downwardly erected, and other parts of the inverted tank are sealed except that the tank port is communicated with the base, the external safety device is mounted outside the inverted tank and comprises a protrusion, the inverted tank is located inside the protrusion, and the external safety device is of a mesh shape or a slice shape and has a characteristic of firm water tolerance.

2. The underwater electric wire connection waterproof device according to claim 1, wherein, a connection manner of the connecting portion is a standard joint manner.

3. The underwater electric wire connection waterproof device according to claim 1, wherein, a connection manner of the connecting portion is a wiring board manner, the two electric wires are respectively fixed on a same conductive metal with screws so that the two electric wires are connected, and a structure of a wiring board is fixed on an insulating bracket.

4. The underwater electric wire connection waterproof device according to claim 1, wherein, a connection manner of the connecting portion is a plug-in connection meeting an electrical standard.

5. The underwater electric wire connection waterproof device according to claim 1, further comprising a bracket, a water-touching probe, a signal processing device and an alarm device, wherein, the bracket is of a column shape, a bottom of the bracket is fixed on the base, and an upper part of the bracket is equipped with the water-touching probe and the signal processing device;

the water-touching probe is conductive after touching water, and is connected with the alarm device; the signal processing device is mounted on the bracket, a signal input of the signal processing device is connected with the water-touching probe, and a processed alarm signal is input into the alarm device; the alarm device emits sound and light signals when receiving an alarm signal, and the alarm device is mounted at a monitoring place for an administrator.

6. The underwater electric wire connection waterproof device according to claim 1, further comprising a bracket, a water-touching probe, a signal processing device, an air pump and a conduit, wherein, the bracket is erected on the base and bears the water-touching probe, the signal processing device and the air pump; one end of the conduit is connected with an air inlet of the air pump, and the other end of the conduit penetrates through the base to extend to a position which is outside the inverted tank and higher than the base; the water-touching probe is mounted at a warning water level and is conductive after touching water; an output signal of the water-touching probe is input into the signal processing device; after the signal processing device receives the output signal emitted by the water-touching probe, the air pump is initiated to work for a fixed time so as to increase an amount of air in the inverted tank.

7. The underwater electric wire connection waterproof device according to claim 1, further comprising a bracket, chemical medicines and a chemical medicine basket, wherein, the bracket is erected on the base and bears the chemical medicine basket; the chemical medicines generate a non-conductive gas when encountering water; the chemical medicine basket is used for accommodating the chemical medicines.

8. The underwater electric wire connection waterproof device according to claim 1, further comprising a bracket, an air pressure tank, a gas releasing device and a water-touching probe, wherein, the bracket is erected on the base and bears the air pressure tank and the water-touching probe; the gas releasing device is fixed on the air pressure tank, the air pressure tank is filled with a non-conducting compressed gas; the gas releasing device is connected with a gas outlet pipe of the air pressure tank, receives a signal emitted by the water-touching probe and performs a corresponding action; when water exists outside the inverted tank and overflows the tank port, the inverted tank has water; when water overflows a warning water level, the water-touching probe emits a signal to be sent to the gas releasing device.

9. The underwater electric wire connection waterproof device according to claim 1, further comprising a bracket, a water electrolysis device, a water-touching probe and a signal processing device, wherein, the bracket is erected on the base and bears the water electrolysis device, the water-touching probe and the signal processing device;

the water electrolysis device is provided with two electrodes; the two electrodes are located outside the tank port, one of the two electrodes is located below the tank port, and the other of the two electrodes is located beyond a scope below the tank port; when water outside the inverted tank overflows a warning water level, the water-touching probe emits a signal; after the signal processing device receives the signal emitted by the water-touching probe, the water electrolysis device is initiated to work for a fixed time.

10. The underwater electric wire connection waterproof device according to claim 1, further comprising a portable motor, a portable air pump, a conduit, a crutch-type air delivery pipe and a switch device, wherein, the portable motor is connected with the portable air pump to provide power for the portable air pump; an outlet of the portable air pump is connected with the conduit for pressurizing and storing air; one end of the conduit is connected with the portable air pump, and the other end of the conduit is connected with the switch device on the crutch-type air delivery pipe; the crutch-type air delivery pipe is tubular, one end of the crutch-type air delivery pipe is connected with the conduit via the switch device, and, the other end of the crutch-type air delivery pipe is a curve of a crutch; the switch device is used for release of a compressed gas.

11. The underwater electric wire connection waterproof device according to claim 1, further comprising several blocks having specific gravities lighter than a specific gravity of water and placed on the base, wherein, the specific gravity of each block is 0.7-0.9; a quantity of each block is enough to basically cover a water surface of the inverted tank.

12. The underwater electric wire connection waterproof device according to claim 1, further comprising a bracket and a breaker, wherein, a lower end of the bracket is fixed on the base; the breaker is anti-creeping, input and output ends of the breaker are connected with the electric wires, and the breaker is conducted at a normal state.

13. The underwater electric wire connection waterproof device according to claim 1, wherein, the inverted tank is filled with oil, and the oil is insulating.

14. The underwater electric wire connection waterproof device according to claim 1, further comprising a bracket, a detected gas, a gas probe, a signal processing device and an alarm device, wherein, the bracket is erected on the base and bears the gas probe and the signal processing device; the detected gas is charged in the inverted tank which is at an operating state, and has a specific gravity lighter than that a specific gravity of air; the gas probe is configured to emit an alarm signal when the detected gas is not detected, and is connected with the signal processing device; a signal input of the signal processing device is connected with the gas probe, and a processed signal is input to the alarm device; the alarm device receives the alarm signal and then emits sound and light signals, and the alarm device is mounted at a monitoring place for an administrator.

15. The underwater electric wire connection waterproof device according to claim 1, further comprising a rope and a floating ball, the rope and the floating ball are mounted on a top of the inverted tank; and one end of the rope is fixed on the top of the inverted tank, and the other end of the rope is fixed on the floating ball.

* * * * *